US008597584B2

(12) United States Patent
Ohmi et al.

(10) Patent No.: US 8,597,584 B2
(45) Date of Patent: Dec. 3, 2013

(54) GAS PURIFYING PROCESS AND DEVICE

(75) Inventors: Tadahiro Ohmi, Sendai (JP); Ryuichi Yazaki, Iwatsuki (JP); Masato Kawai, Yokohama (JP); Tetsuya Kimijima, Tsuchiura (JP); Kunio Matsuda, Utsunomiya (JP)

(73) Assignees: Taiyo Nippon Sanso Corporation, Tokyo (JP); Tadahiro Ohmi, Sendai-shi, Miyagi-ken (JP)

( * ) Notice: Subject to any disclaimer, the term of this patent is extended or adjusted under 35 U.S.C. 154(b) by 103 days.

(21) Appl. No.: 12/801,052

(22) Filed: May 19, 2010

(65) Prior Publication Data

US 2010/0247395 A1    Sep. 30, 2010

Related U.S. Application Data

(62) Division of application No. 10/515,320, filed as application No. PCT/JP03/06548 on May 26, 2003, now Pat. No. 7,744,836.

(30) Foreign Application Priority Data

May 24, 2002 (JP) ................................. 2002-150522

(51) Int. Cl.
*B01D 53/46* (2006.01)
*B01D 53/60* (2006.01)

(52) U.S. Cl.
USPC .......................................... 422/169; 422/172

(58) Field of Classification Search
USPC ................... 422/169, 170, 171, 172
See application file for complete search history.

(56) References Cited

U.S. PATENT DOCUMENTS

| 3,976,745 A | 8/1976 | Nakajima et al. |
| 4,277,363 A | 7/1981 | Duhayon et al. |
| 4,910,004 A | 3/1990 | Hamon et al. |
| 5,202,096 A | 4/1993 | Jain et al. |
| 5,204,075 A | 4/1993 | Jain et al. |

(Continued)

FOREIGN PATENT DOCUMENTS

| EP | 0 826 629 A2 | 3/1998 |
| EP | 0 832 678 A  | 4/1998 |

(Continued)

OTHER PUBLICATIONS

Machine translation of JP 7-138007, cited on PTO-1449, 9 pages.*

(Continued)

*Primary Examiner* — Jill Warden
*Assistant Examiner* — Joye L. Woodard
(74) *Attorney, Agent, or Firm* — Nixon & Vanderhye P.C.

(57) ABSTRACT

This gas purifying process removes trace constituents from a mixed gas that includes a rare gas and nitrogen as main components, and at least one from among hydrogen, nitrogen and hydrogen reaction products, and water vapor as the trace constituent. This process sequentially carries out an adsorbing step for removing water vapor and nitrogen and hydrogen reaction products; a hydrogen oxidation step for converting the hydrogen into water vapor by means of a hydrogen oxidation catalytic reaction in the presence of oxygen; and a drying step for removing water vapor generated in the hydrogen oxidation step. When nitrogen oxides are included as a trace constituent, then a denitration step is carried out prior to the adsorbing step, to convert nitrogen oxides into nitrogen and water vapor by means of a catalytic denitration reaction in the presence of a reducing substance.

3 Claims, 3 Drawing Sheets

(56) References Cited

U.S. PATENT DOCUMENTS

| | | |
|---|---|---|
| 6,083,301 A * | 7/2000 | Gary et al. .................. 95/130 |
| 6,113,869 A | 9/2000 | Jain et al. |
| 2002/0035921 A1 | 3/2002 | Ishihara et al. |
| 2002/0141925 A1 | 10/2002 | Wong et al. |
| 2002/0184907 A1 | 12/2002 | Vaiyapuri et al. |
| 2003/0203105 A1 | 10/2003 | Porta et al. |

FOREIGN PATENT DOCUMENTS

| | | |
|---|---|---|
| EP | 1 190 759 A2 | 3/2002 |
| GB | 1 413 349 A | 11/1975 |
| JP | 52-65762 | 5/1977 |
| JP | 53 132465 A | 11/1978 |
| JP | 6-327973 | 11/1994 |
| JP | 7-138007 | 5/1995 |
| JP | H08-206495 | 8/1996 |
| JP | 9-213596 | 8/1997 |
| JP | 10-7410 | 1/1998 |
| JP | 10-85587 | 4/1998 |
| JP | 10-273307 | 10/1998 |
| JP | 11-219907 | 8/1999 |
| JP | 2000-95512 | 4/2000 |
| JP | 2001-120951 | 5/2001 |
| JP | 2001-232134 | 8/2001 |
| JP | 2002-97007 | 4/2002 |
| WO | WO 00/40324 | 7/2000 |
| WO | WO 03/080236 | 10/2003 |

OTHER PUBLICATIONS

Machine translation of JP 7-138007 (May 1995) 9 pages.*
International Search Report PCT/JP03/06548, mailed Aug. 26, 2003.

* cited by examiner

GAS PURIFYING PROCESS AND DEVICE

This application is a divisional of application Ser. No. 10/515,320 filed Jun. 15, 2005, now U.S. Pat. No. 7,744,836, now allowed, which in turn is the US national phase of international application PCT/JP03/06548 filed May 26, 2003 which designated the U.S. and claims benefit of JP 2002-150522, dated May 24, 2002, the entire content of which is hereby incorporated by reference.

TECHNICAL FIELD

The present invention relates to a gas purifying process and device, for example, a gas purifying process and device that is employed to remove in advance such trace constituents as hydrogen, nitrogen and hydrogen reaction products, and water vapor, as well as nitrogen oxides, which can impair the operation to separate and reclaim the rare gases krypton and xenon from a mixed gas. The present invention is suitable as a process and device for removing the aforementioned trace constituents as a treatment prior to the device for separating and reclaiming rare gases that are present in the exhaust gas discharged from, for example, a plasma processor, in the manufacturing process for making a semiconductor product.

BACKGROUND ART

In the manufacturing process for making semiconductor products such as a semiconductor integrated circuits, liquid crystal panels, solar battery panels, and magnetic disks, or flat displays or other electronic instruments, plasma is first generated within a rare gas atmosphere and then a variety of processes are performed using the plasma, such as plasma CVD, plasma oxidation, plasma nitridation, plasma oxynitridation, reactive ion etching and the like.

When introducing a substrate or the like for a semiconductor display or other electronic instrument product into the processor where these processes are performed, nitrogen is employed as the atmospheric gas, and argon, krypton or xenon, and a gas that contributes to the reaction, are introduced into the processor as gases for the plasma process. The plasma is then generated under reduced pressure using high frequency induction or microwave excitation. Afterwards, these used gases are then exhausted using a vacuum pump, rendered harmless in a detoxifying device, and released into the air. Before removing the processed substrate from the evacuated processor, the vacuum state within the processor is returned to atmospheric pressure, and nitrogen gas is introduced into the processor to prevent air from becoming mixed into the device.

Regarding the aforementioned gas that contributes to the reaction, small amounts of oxygen or small amounts of oxygen and hydrogen can be employed in the case of a plasma oxidation process; and small amounts of nitrogen and hydrogen or ammonia may be employed in the case of a plasma nitridation process. In the case of an oxynitridation process, into which investigations have begun of late, these gases may be used in combination.

In the past, argon has primarily been used as the rare gas comprising the atmospheric gas for these types of processes. In recent years however, with higher quality processing the objective, it has come to be understood that krypton and xenon, which have low-ionization potential, are extremely beneficial as gases that can form a film of superior properties. Accordingly, these gases have been coming into use.

However, krypton and xenon are only contained in air in trace amounts. Thus, in order to separate and purify krypton and xenon from the air, it is not only necessary to process a large amount of air, but the separating and purifying process becomes complicated. As a result, purified krypton and xenon are extremely expensive. Thus, in order to practically realize a process employing krypton or xenon, it is extremely important to establish a system in which the used krypton and xenon can be reclaimed, purified and reutilized in the processor.

However, the gas exhausted in these types of processors consists mainly of the rare gas and nitrogen, with trace amounts of oxygen, hydrogen, and water vapor included from the oxidation process, as well as nitrogen and hydrogen reaction products such as ammonia, ammonium ion, N—H radical, etc. included from the nitridation process. Further, nitrogen oxides are added in the oxynitridation process. Accordingly, it has been extremely technically difficult to reclaim and reutilize the rare gas, given that multiple reactive trace constituents must be removed from the exhaust gas without inviting loss of the rare gas.

A variety of processes for simply separating and purifying a specific constituent from a mixed gas of this type have been reported. For example, Japanese Patent Application, First Publication No. Sho 52-65762 discloses that use of copper oxide or copper powder and palladium powder is effective as a remover for removing oxygen or hydrogen present in a mixed gas, for example.

Japanese Patent Application, First Publication No. Hei 10-7410 discloses a method for removing water from argon by bringing argon containing oxygen into contact with a deoxygenation catalyst and hydrogen, converting the oxygen into water, and then bringing this into contact with the adsorbent zeolite.

Regarding the removal of nitrogen oxides (NOx), Japanese Patent Application, First Publication No. Hei 10-85587 discloses an NOx adsorbent which efficiently adsorbs and removes low concentrations of nitrogen oxides from a gas such as combustion gas in a highway tunnel, where a large amount of moisture and a low concentration, on the order of several ppm, of nitrogen oxides are both present.

Japanese Patent Application Hei 6-327973 discloses both a method for removing nitrous oxide ($N_2O$) in exhaust gas, along with dust, which is one cause of the global warming effect and destruction of the ozone layer, and a filter-type removal equipment which can easily, inexpensively and effectively reduce nitrous oxide.

Japanese Patent Application 2001-120951 discloses a treatment method and device that can very efficiently adsorb nitrogen oxides, desorb the adsorbed nitrogen oxides to a high concentration, and easily crack and remove the desorbed nitrogen oxide.

However, all of the technologies disclosed in these patent applications are processes that address only one type of constituent from among nitrogen oxides, hydrogen and oxygen. These are not techniques for reclaiming a beneficial gas from a gas that is flowing at low volume and contains multiple types of trace constituents, as in the case of the gas discharged from the various processes for manufacturing a semiconductor device or other electronic instrument. In other words, these are not technologies which provide a unified arrangement for separating/removing/purifying trace constituents contained in an exhaust gas, in order to reclaim a beneficial gas from the gas discharged from the processor for manufacturing a semiconductor device or other electronic instrument.

On the other hand, Japanese Patent Application, First Publication No. 2001-232134 discloses a purifying method for the case where fluorine, krypton, nitrogen, oxygen, carbon monoxide, carbon dioxide and water are included in the neon gas removed from a KrF excimer laser oscillator in a semiconductor manufacturing device, consisting of a first step of removing fluorine; a second step of removing the oxygen using a metal oxide catalyst and then removing the carbon dioxide and water by adsorption; a third step of removing the krypton using low temperature adsorption; and a fourth step of removing the nitrogen and carbon monoxide using further low temperature adsorption. However, in this method, it is necessary to use low-temperature adsorption frequently, making a large facility for cooling necessary. Thus, this is a troublesome and costly process. While this may be a process that is suitable for employment by an industrial gas maker within its facility, it would be difficult to employ this process at a manufacturing site for semiconductor devices or electronic instruments, and, moreover, near the plasma processing facilities, as a process for sequentially separating, reclaiming and reutilizing a rare gas from the gases removed from the device.

Thus, it has been problematic that there has been no suitable process from among the various technologies known conventionally that can be used near the manufacturing equipment for semiconductor devices or other electronic instruments, and is capable of efficiently removing two or more types of constituents that are included in addition to a rare gas in the gas discharged from the various processes for manufacturing a semiconductor device or other electronic instrument. In particular, while investigations have been made of various types of removing device according to the type of constituent contained in the exhaust gas in addition to a rare gas, no process has been established that is capable of efficiently removing a plurality of constituents from a mixed gas that contains these along with a rare gas, and can limit the loss of the rare gas and thus enable a high rate of reutilization thereof.

It is thus the objective of the present invention to provide a gas purifying process and device that can remove with high efficiency and low cost such trace constituents as hydrogen, hydrogen and nitrogen reaction products, and water vapor, as well as nitrogen oxides, that are included in a mixed gas containing a rare gas, and more particularly, that can be applied to the exhaust gases from the various processes of oxidation, nitridation, and oxynitridation that use expensive krypton and xenon, and moreover, that enables realization of a small-scale system that can be disposed near the manufacturing equipment for making semiconductor devices or other electronic instruments, that is capable of continuously separating, reclaiming, and reutilizing the rare gas present in the exhaust gas.

DISCLOSURE OF THE INVENTION

The present invention's gas purifying process is a gas purifying process for removing trace constituents from a mixed gas containing a rare gas and nitrogen as main components and at least one of hydrogen, nitrogen and hydrogen reaction products, and water vapor as trace constituents, the process characterized in comprising an adsorbing step for removing water vapor and nitrogen and hydrogen reaction products; a hydrogen oxidation step for converting the hydrogen present in the mixed gas which has gone through the adsorbing step into water vapor by means of a hydrogen oxidation catalytic reaction in the presence of oxygen; and a drying step for removing water vapor generated in the hydrogen oxidation step. When it is presumed that nitrogen oxides are included in the mixed gas, then a denitration step is carried out prior to the adsorbing step, to convert nitrogen oxides into nitrogen and water vapor by means of a catalytic denitration reaction in the presence of a reducing substance.

In the process of the present invention, it is preferable that the rare gas be either krypton or xenon, or a mixture thereof; that the nitrogen oxides include at least one of nitrous oxide, nitric oxide and nitrogen dioxide, or radicals or ions thereof; that the reducing substance be either hydrogen or ammonia or a mixture thereof; that at least one of the adsorbing step and the drying step be carried out by a adsorbing and separating method by temperature swing; that the line for introducing the mixed gas to the denitration step be heated to 150° C. or higher, and preferably 210° C. or higher; and that the adsorbent used in the adsorbing step and the drying step be potassium ion-exchanged A-type zeolite.

In the present invention's process, when adding a reducing substance to the mixed gas that is introduced into the denitration step, it is preferable to control the amount of the reducing substance added based on at least one of either the reducing substance and the nitrogen oxide amounts present in the mixed gas prior to entering the denitration step, or the reducing substance and nitrogen oxide amounts present in the mixed gas after exiting the denitration step. Further, when adding oxygen to the mixed gas that is introduced into the hydrogen oxidation step, it is preferable to control the amount of oxygen added based on at least one of either the oxygen and hydrogen amounts present in the mixed gas prior to entering the hydrogen oxidation step, or the oxygen and hydrogen amounts present in the mixed gas after exiting the hydrogen oxidation step.

It is acceptable that the aforementioned mixed gas be the exhaust gas from the manufacturing equipment for making semiconductor devices or other electronic instruments. In this case, it is preferable to control the amount of reducing substance added to the mixed gas that is entering the denitration step, and to control the amount of oxygen added to the mixed gas that is entering the hydrogen oxidation step based on the composition of the gas being employed in the manufacturing equipment.

The gas purifying device according to the present invention is a gas purifying device for removing trace constituents from a mixed gas that includes a rare gas and nitrogen as main components, and at least one from among hydrogen, nitrogen and hydrogen reaction products, and water vapor as a trace constituent, this device characterized in the provision of an adsorbing device for removing water vapor and nitrogen and hydrogen reaction products using an adsorbent; an oxygenation device for adding oxygen to the mixed gas that is leaving the adsorbing device; a hydrogen oxidation device for converting the hydrogen in the mixed gas after the oxygen has been added to water vapor by causing a reaction with the oxygen using a hydrogen oxidation catalyst; and a drying device for removing the water vapor generated in the hydrogen oxidation device using an adsorbent. When it is presumed that nitrogen oxides are included in the mixed gas, then there are provided at a stage prior to the adsorbing device, a reducing substance adding device for adding ammonia or hydrogen to the mixed gas as a reducing substance, and a denitration device which employs a catalytic denitration reaction to react the nitrogen oxides present in the mixed gas after addition of the reducing substance, with the reducing substance, to convert the nitrogen oxides to nitrogen and water vapor.

BEST MODE FOR CARRYING OUT THE INVENTION

Preferred embodiments of the present invention will now be explained with reference to the figures. However, the present invention is not limited to the following embodiments. Rather, for example, the compositional elements of these embodiments may be suitably combined.

Figure 1:
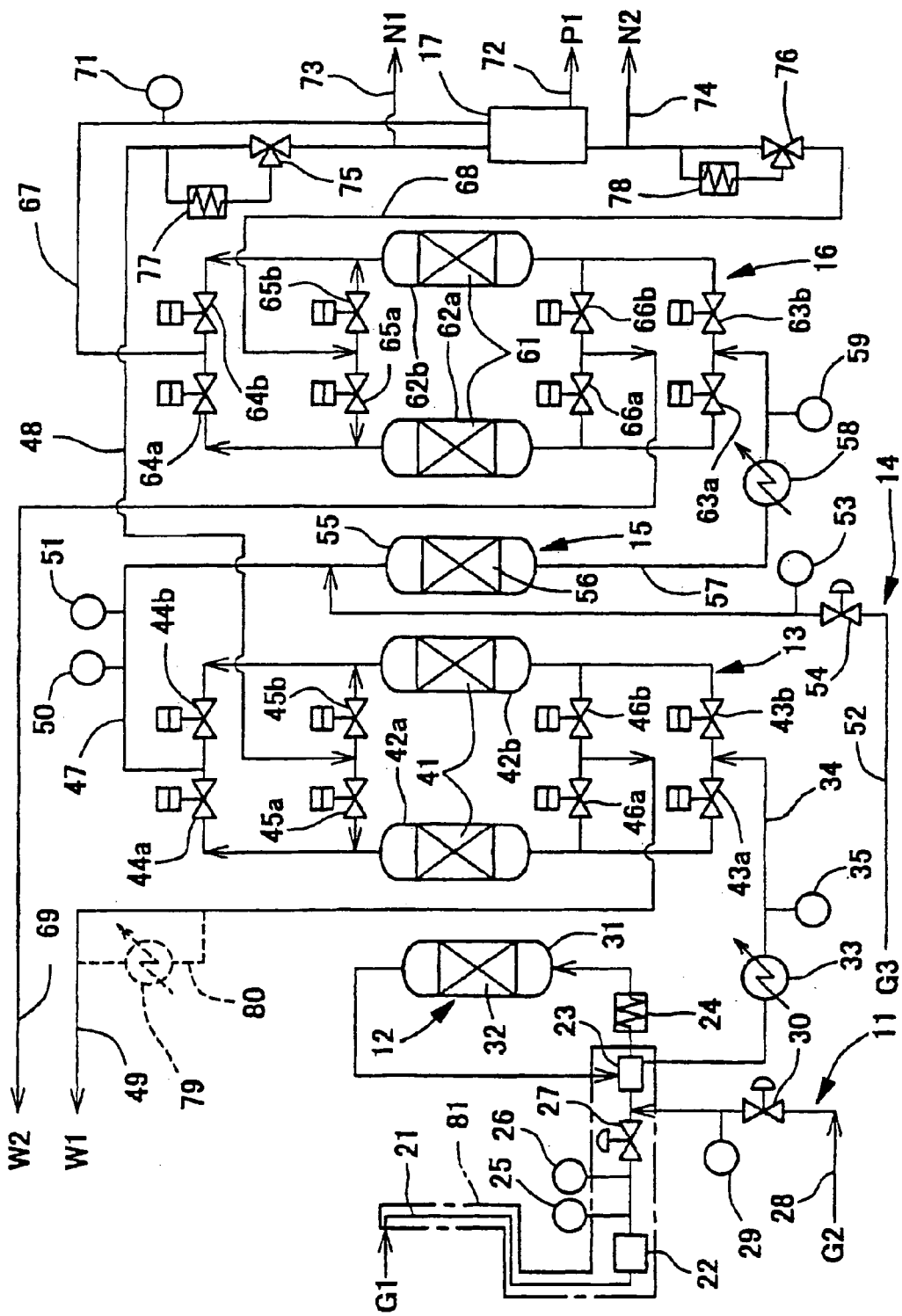
FIG. 1 is a schematic flow diagram showing a first embodiment of a gas purifying device employing the present invention.

FIG. 1 is a schematic flow diagram showing a first embodiment of a gas purifying device employing the present invention. When separating and reclaiming an exhaust gas containing a rare gas, such as for example, when separating and reclaiming krypton from a mixed gas presumed to contain krypton and nitrogen as main components, and nitrogen oxides, hydrogen, oxygen, ammonium, water vapor and the like as trace constituents, that is removed from semiconductor manufacturing equipment like a plasma oxidation device, plasma nitridation device or plasma oxynitridation device, the present invention's gas purifying device performs a pre-stage purifying process to remove from among the trace constituents, at least the nitrogen oxides, hydrogen, ammonium and water vapor that can impair the final separation and reclaiming operations in the rare gas separating and reclaiming device. This device is provided with a reducing substance adding device 11, a denitration device 12, adsorbing device 13, oxygenation device 14, hydrogen oxidation device 15 and drying device 16. Further, a rare gas separating and reclaiming device 17 is added to a stage subsequent to drying device 16.

In this explanation, ammonia was employed as an example of a nitrogen and hydrogen reaction product. However, the same applies to the case where ammonium ion or N—H radical are included. The nitrogen included in the exhaust gas containing the rare gas not only includes the nitrogen discharged from the reactor of the semiconductor manufacturing equipment, but also the nitrogen taken up from the various pumps in later stages.

Regarding the composition of the mixed gas removed from the semiconductor manufacturing equipment which is the source material for reclaiming the rare gas (and is referred to as "source gas" hereinafter), in the case of the exhaust gas from the plasma oxidation, plasma nitridation or plasma oxynitridation processes in a semiconductor manufacturing process using krypton or xenon, the exhaust gas from the plasma oxidation process contains mainly the rare gas krypton or xenon, and purge nitrogen (including nitrogen trapped in the back purge pump), as well as trace amounts of oxygen, water vapor and, sometimes, hydrogen. In addition to the rare gas and nitrogen, the exhaust gas from the plasma nitridation process may also include as trace constituents ammonia, as the main nitrogen and hydrogen reaction product, and hydrogen and water vapor. In addition to the exhaust gas components in the plasma oxidation and the plasma nitridation processes, the exhaust gas from the plasma oxynitridation process also includes nitrogen oxides. While it will of course depend on the scale of the semiconductor equipment, the exhaust concentration of the trace constituents from each reactor often is such that each nitrogen oxide is contained in the amount of 1 vol % or less, hydrogen in the amount of 2 vol % or less, oxygen in the amount of 2 vol % or less, ammonia in the amount of 1 vol % or less, and water vapor in the amount of 5 vol %.

The device of the present embodiment shown in FIG. 1 has a design that can be applied to each of these processes. For example, this device may be applied to the case where the processes of oxidation, nitridation and oxynitridation are all carried out by one semiconductor manufacturing apparatus, and the discharged gases therefrom are processed, or to the case where the processes of oxidation, nitridation and oxynitridation are each carried out by different semiconductor manufacturing apparatuses, and the discharged gases therefrom are all discharged together. In addition, a gas purifying device of this design is also applicable to the case where only one of the processes of oxidation, nitridation and oxynitridation is carried out.

Source gas G1 passes from source gas introduction path 21, through buffer container 22, heat exchanger 23, and heater 24, and into denitration device 12, where the denitration step is carried out. Source gas analyzer 25 and source gas flow meter 26 are provided to source gas introduction path 21, and perform component analysis and measurement of the trace constituents of the source gas. The amount of source gas introduced is adjusted via flow controlling valve 27.

Reducing substance adding device 11 adds a reducing substance G2, such as ammonia or hydrogen, that can convert the nitrogen oxides in the source gas into nitrogen and water vapor using a catalytic denitration reaction in denitration device 12, to the source gas by passing reducing substance G2 through reducing substance adding path 28. The amount of reducing substance added is set so that the total amount of reducing substance in the source gas is sufficient to convert the nitrogen oxides, and is measured by reducing substance flow meter 29 that is provided to reducing substance adding path 28. The amount of reducing substance added can be adjusted using reducing substance flow controlling valve 30.

The source gas is heated to a pre-set reaction temperature in heat exchanger 23 and heater 24, and is introduced into denitration device 12. In this denitration device 12, a reaction column (denitration reaction column) 31 is filled with denitration catalyst 32. For example, in the case where ammonia is employed as the nitrogen oxide reducing substance, nitrogen oxides such as nitrous oxide ($N_2O$), nitric oxide (NO) and nitrogen dioxide ($NO_2$) are each converted to nitrogen and water vapor by the catalytic denitration reactions shown below.

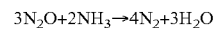
$3N_2O+2NH_3 \rightarrow 4N_2+3H_2O$

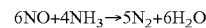
$6NO+4NH_3 \rightarrow 5N_2+6H_2O$

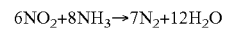
$6NO_2+8NH_3 \rightarrow 7N_2+12H_2O$

The reaction between the ammonia and the oxygen included in the source gas occur simultaneously.

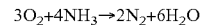
$3O_2+4NH_3 \rightarrow 2N_2+6H_2O$

Similarly, when hydrogen is employed as the reducing substance, the following reactions occur.

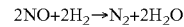
$2NO+2H_2 \rightarrow N_2+2H_2O$

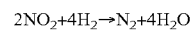
$2NO_2+4H_2 \rightarrow N_2+4H_2O$

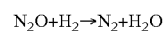
$N_2O+H_2 \rightarrow N_2+H_2O$

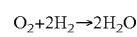
$O_2+2H_2 \rightarrow 2H_2O$

A commercially available product may be employed for the denitration catalyst. In addition, the reaction temperature may be set to a suitable value according to the conditions of the various operations such as the type and amount of catalyst employed, the nitrogen oxide concentration and flow quantity, the type of reducing substance employed, etc. Typically, the reaction temperature is set to 250° C. or higher, and, preferably around 300° C. It is also acceptable to provide a heating device to denitration reaction column 31 in place of heater 24.

It is particularly necessary to consider safety when employing hydrogen as the reducing substance in the denitration reaction, and a technique is required to limit the concentration of the hydrogen gas added to a level that is below the threshold for explosion, or to control the composition of the exhaust gas from the semiconductor manufacturing equipment to a composition that will not explode, regardless of the hydrogen gas concentration. It is thus desirable to provide a sintered metal to either end of denitration reaction column 31, as a countermeasure to explosions.

The source gas (denitrated gas) leaving denitration device 12 undergoes heat recovery through heat exchange with source gas at heat exchanger 23. By undergoing heat exchange with cooled water at cooler 33, this source gas is cooled to room temperature, passes through denitrated gas path 34, and is introduced into adsorbing device 13, where the adsorbing step (adsorbing process) is carried out. A denitrated gas analyzer 35 is provided to denitrated gas path 34, for confirming the state of the denitration reaction at denitration device 12.

Adsorbing device 13 is a double column switchover type device having a pair of adsorbing columns 42a, 42b, each filled with adsorbent 41. Adsorbing device 13 is designed so that while one of the adsorbing columns is carrying out an adsorbing step to adsorb and remove water vapor, etc., the other adsorbing column is carrying out a reclaiming process in which the adsorbed water vapor, etc. is desorbed from the adsorbent. It is necessary that the employed adsorbent 41 at least be able to adsorb and remove the water vapor generated in the denitration step in denitration device 12.

When ammonia is included in the source gas, or when ammonia is employed as the reducing substance, an adsorbent may be selected that can adsorb the ammonia present in the denitrated gas, such as, for example, activated carbon, silica gel, various types of zeolite, etc. Among these types of adsorbents, potassium-ion exchanged A-type zeolite has the property of being able to sufficiently adsorb water vapor and ammonium, while hardly adsorbing the rare gas at all. Thus, by using this as the adsorbent, it is possible to reclaim the rare gas even more efficiently, with a reclaiming rate of 98% or more anticipated, even after taking into consideration the loss during reclaiming in the adsorbing column.

When, for example, adsorbing column 42a is carrying out the adsorbing step in adsorbing device 13, then inlet valve 43a and outlet valve 44a for adsorbing column 42a are open, and reclaiming inlet valve 45a and reclaiming outlet valve 46a for adsorbing column 42a are closed. Denitrated gas from denitrating gas path 34 passes through inlet valve 43a, and is introduced into adsorbing column 42a. Denitrated gas from which water vapor and ammonia have been adsorbed and removed after coming into contact with adsorbent 41 inside the column, passes through outlet valve 44a, and is introduced into dry denitrated gas path 47.

At the other adsorbing column 42b, inlet valve 43b and outlet valve 44b are closed, and reclaiming inlet valve 45b and reclaiming outlet valve 46b are open. Reclaimed gas from adsorbent reclaiming gas path 48 passes through reclaiming inlet valve 45b and is introduced into the column. After the adsorbent has been reclaimed, this exhaust gas W1 passes from reclaiming outlet valve 46b through reclaimed gas exhaust path 49. When ammonia is included in exhaust gas W1, exhaust gas W1 is exhausted after a process has been performed to remove the ammonia.

By switching between open and closed states for each valve according to a preset timing, the adsorbing columns switch between adsorbing and reclaiming steps. As a result, the adsorption and removal of water vapor, etc. in the denitrated gas is continuously carried out. When ammonia is included in the denitrated gas, an ammonia detector is provided at the adsorbing column outlet, and progression of ammonia adsorption by the adsorbent is detected. By determining the process switchover timing based on this signal, the adsorbent can be completely used and the number of switchovers during processing can be reduced. As a result, a longer lifespan for the valve etc., can be anticipated. At the same time, it is possible to reduce the loss of rare gas that occurs during switching between processes in the adsorbent columns.

A dry denitrated gas analyzer 50 and a dry denitrated gas flow meter 51 are provided to dry denitrated gas path 47. Based on the hydrogen amount in the dry denitrated gas measured here, the amount of oxygen G3 added from oxygenation device 14 is set so that the amount of oxygen in the dry denitrated gas is sufficient to oxidize the hydrogen. The amount of oxygen added is adjusted using oxygen flow controlling valve 54 and oxygen flow meter 53 that are provided to oxygenation path 52.

Following addition of the oxygen, the dry denitrated gas is introduced into hydrogen oxidation device 15 and a hydrogen oxidation step (hydrogen oxidation process) is performed. The hydrogen reacts with the oxygen through a hydrogen oxidation catalytic reaction, and is converted to water vapor. In hydrogen oxidation device 15, reaction column (hydrogen oxidation column) 55 is filled with hydrogen oxidation catalyst 56. A conventionally known oxidation catalyst may be suitably selected and employed for hydrogen oxidation catalyst 56. Since the hydrogen oxidation catalytic reaction is an exothermic reaction, as in the case of denitration device 12, promotion of the reaction and heat recovery can be planned for by providing a heat exchanger that causes indirect heat exchange between introduced and discharged gases. When there is a large amount of heat generated, hydrogen oxidation column 55 can be segmented into several parts, arrayed in a straight line, and intermediate coolers can be provided between the columns.

Cooler 58 is employed to remove the reaction heat from the dehydrogenated gas exiting hydrogen oxidation device 15 and entering dehydrogenated gas path 57, and the gas composition is measured at dehydrogenated gas analyzer 59. The denitrated gas is then introduced into drying device 16, and a drying step (drying process) is carried out. The water vapor generated during the hydrogen oxidation step is adsorbed and removed by the adsorbent.

Drying device 16 has same structure as adsorbing device 13, and is designed as a double column switchover type device having a pair of drying columns (adsorbing column) 62a, 62b each filled with drying agent (adsorbent) 61. Accordingly, in a similar manner as described above, while one adsorbing column is carrying out a drying step in which water vapor is adsorbed and removed, the other adsorbing column is carrying out a reclaiming process in which adsorbed water vapor is desorbed from the adsorbent. Various types of adsorbents may be employed for adsorbent 61. However, in the same manner as before, a potassium-ion exchanged A-type zeolite is optimal as it can sufficiently adsorb water vapor while hardly adsorbing any rare gas at all.

In this drying device 16 as well, when adsorbing column 62a is carrying out the adsorbing step, drying inlet valve 63a and drying outlet valve 64a for adsorbing column 62a are open, and reclaiming inlet valve 65a and reclaiming outlet valve 66a for adsorbing column 62a are closed. As a result, dehydrogenated gas from dehydrogenated gas path 57 passes through drying inlet valve 63a, and is introduced into adsorbing column 62a. The water vapor is adsorbed and removed by adsorbent 61, to form a dry gas. This dry gas then passes through drying outlet valve 64a, and is guided out to dry gas path 67.

At the other adsorbing column 62b, drying inlet valve 63b and drying outlet valve 64b are closed and reclaiming inlet valve 65b and reclaiming outlet valve 66b are open. As a result, the reclaimed gas from adsorbent reclaiming gas path 68 passes through reclaiming inlet valve 65b, and is guided into adsorbing column 62b. After the adsorbent has been reclaimed, the exhaust gas W2 passes from reclaiming outlet valve 66b, through reclaimed gas exhaust path 69 and is exhausted.

The dry gas from which nitrogen oxides, hydrogen and ammonia have been removed in this way forms a mixed gas in which the gas composition is mainly rare gas and nitrogen, with a trace amount of oxygen also included. After confirming the amount of trace constituents at dry gas analyzer 71 which is provided to dry gas path 67, this mixed gas is guided into rare gas separating and reclaiming device 17.

Rare gas separating and reclaiming device 17 processes the dry gas guided in from dry gas path 67, to separate the rare gas and the other gases. Typically, the device employed is one that purifies and reclaims the rare gas at a purity rate of 99.99% or more. The rare gas separating process can be carried out using various operations conventionally employed. For example, such methods can be employed as a low temperature processing method, which employs a cooling media such as liquid nitrogen, etc.; an adsorbing and separating method, which makes use of differences in the ability to adsorb the rare gas versus the other gases; and a membrane separation method, which makes use of differences in membrane permeability; among others. Further, it is also acceptable to combine these methods as needed.

Rare gas P1, which was separated at rare gas separating and reclaiming device 17, is reclaimed as the product from rare gas reclaiming path 72. Nitrogen N1, N2, which were separated from the rare gas at rare gas separating and reclaiming device 17, can be removed from adsorbent reclaiming gas paths 48,68, and used as gases for adsorbent reclaiming. It is acceptable for oxygen to be included in this nitrogen. The nitrogen in excess of that utilized as reclaiming gas is exhausted to the outside of the system from exhausted nitrogen paths 73,74.

In order to more effectively carry out the adsorption/desorption of water vapor, etc., it is desirable that the adsorption/desorption operations in adsorbing device 13 and drying device 16 be carried out using a adsorbing and separating method by temperature swing, in which the adsorption process is carried out at a relatively low temperature and the desorption (reclaiming) process is carried out at a relatively high temperature. For example, it may be set so that the adsorbing step is carried out at room temperature (15~35° C.) and the reclaiming step is carried out at 200~300° C.

In other words, in the desorbing operations that precede the reclaiming process, heat switchover valves 75,76, which are provided respectively to adsorbent reclaiming gas paths 48,68, switchover to reclaiming gas heaters 77,78, the nitrogen is heated to around 300° C. by the heater, and is guided into adsorbing columns in the reclaiming process. Once the desorbing operations are completed, heat switchover valves 75,76 are switched to heater bypass, and the nitrogen is guided into the adsorbing column in the reclaiming process at its present temperature, typically, room temperature. The adsorbent is then cooled, and can be provided to the next adsorption process.

When the amount of nitrogen guided out from the rare gas separating and reclaiming device 17 is not sufficient with respect to the reclaimed gas amount, then nitrogen, etc. may be supplied from other facilities as reclaiming gas. Depending on the circumstances, dry air may also be used. In order to decrease the temperature of the reclaimed gas exhausted from the reclaimed gas exhaust paths 49,69, it is acceptable to provide a reclaimed gas cooling path 80 having a reclaimed gas cooler 79, as shown by the dashed line in FIG. 1, for exhaust path 49.

When ammonia and nitrogen oxides are present together in the source gas, and particularly when ammonia and nitrogen dioxide are included in the source gas, reaction can occur along the path, causing ammonium nitrate to be generated and deposited. Accordingly, when ammonia and nitrogen oxides are present together in the exhaust gas from the semiconductor manufacturing process, or even when there is almost no ammonia in the exhaust gas (source gas), but ammonia is employed as the reducing substance for denitration, a line heating device 81 is provided from the source gas introduction path 21 to the area of heat exchanger 23 and heater 24. By heating the line to 150° C. or more, and preferably to 210° C. or more, which is the thermal cracking temperature of ammonium nitrate, it is possible to prevent the line from becoming sealed shut by ammonium nitrate.

In addition, even when ammonia is included in the source gas, by first converting the nitrogen oxides into water vapor and nitrogen, and adsorbing and removing ammonia along with the generated water vapor, there is no generation of nitrogen oxides from the reaction between oxygen and ammonia in the following hydrogen oxidation step. As a result, it is possible to carry out the removal of trace constituents with good efficiency. Thus, ammonia, which is easy to handle as compared to hydrogen, can be used as the reducing substance.

The amount of reducing substance added with respect to the source gas in the denitration step can be controlled by determining the amount of reducing substance required for the denitration operation based on the concentration of nitrogen oxides in the source gas (analyzer 25) and the amount of source gas (flow meter 26), and then adjusting the flow controlling valve 30. However, it is also acceptable to control flow controlling valve 30 so that the concentration of the reducing substance remaining in the denitrated gas after the denitration step is a constant value. The operational conditions can be controlled based on flow meter 29 so that the reducing substance is added at a constant flow quantity.

Regarding the amount of reducing substance to be added, the amount theoretically required can be calculated based on the amount of nitrogen oxides and the chemical reaction equation. However, in order to completely remove the nitrogen oxides, this amount should be controlled so that an amount in excess of the theoretical amount is added. However, because the excess reducing substance will have to be removed by equipment at a later stage, it is preferable to control the amount added to the minimum required. The composition of the exhaust gas can be estimated in response to the gas composition, flow quantity and reaction conditions employed in the semiconductor manufacturing equipment, and the amount of reducing substance added can be controlled based on the estimated nitrogen oxide amount and reducing substance amount. Since estimate error will occur in this case, it is necessary to add reducing substance in relative excess. Nevertheless, this method is beneficial as it simple and does not require analysis.

As in the case of controlling the amount of reducing substance added, controlling the amount of oxygen added in the hydrogen oxidation step can be carried out simply by determining the amount of oxygen required for oxidation of hydrogen based on the concentration (analyzer 50) of hydrogen and oxygen in the dry denitrated gas and the gas quantity (flow meter 51), and adjusting flow controlling valve 54. However, it is also acceptable to control the amount of oxygen added so that the concentration (analyzer 59) of oxygen remaining in the dehydrogenated gas after the hydrogen oxidation step is constant. It is also acceptable to perform control based on operating conditions, using flow controlling valve 54 so the amount of oxygen added is constant. Further, it is possible to estimate the composition of the exhaust gas corresponding to the composition of the gas employed, its flow quantity and the reaction conditions in the semiconductor manufacturing equipment. The amount of oxygen added can then be controlled based on the estimated hydrogen quantity.

Figure 2:
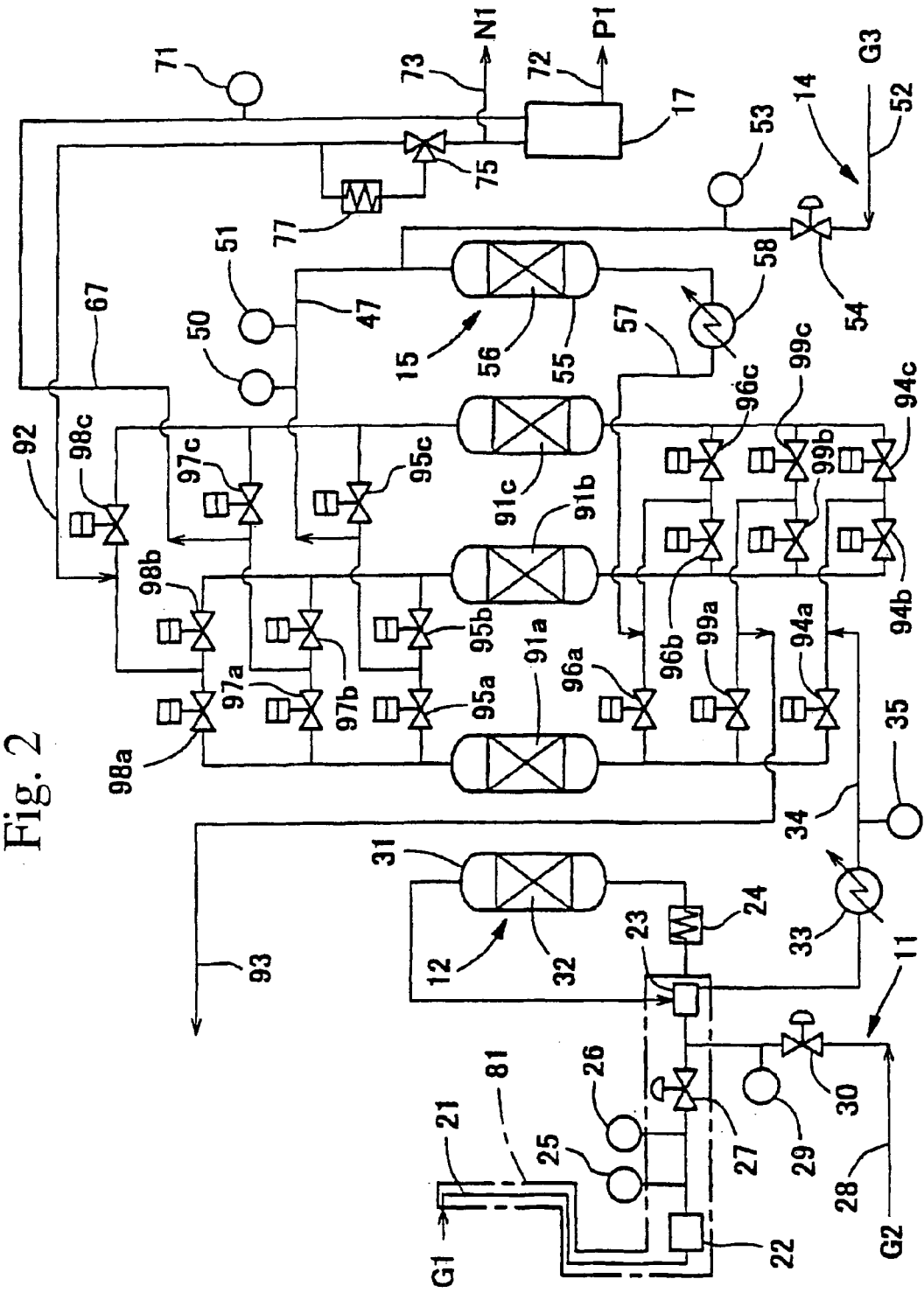
FIG. 2 is a schematic flow diagram showing a second embodiment of a gas purifying device employing the present invention.

FIG. 2 is a schematic flow diagram showing a second embodiment of a gas purifying device employing the present invention, and combines in a unified manner the drying device 16 and adsorbing device 13 of the first embodiment. In the following explanation, compositional elements that are the same as those in the gas purifying device shown in Embodiment 1 have been assigned the same numeric symbol and an explanation thereof has been omitted.

In this embodiment, three adsorbing columns 91a, 91b, 91c are provided as adsorbing facilities. Denitrated gas from denitrated gas path 34, dehydrogenated gas from dehydrogenated gas path 57 and reclaimed gas from common reclaimed gas path 92 can each be guided into an optional adsorbing column, and valves and lines are provided so that the denitrated, dehydrogenated or reclaimed gases can each be guided from the optional adsorbing column out to any of either dry denitrated gas path 47, dry gas path 67 or common reclaimed gas exhaust path 93.

In this adsorbing facility, switching between processes occurs in three stages, for example, such that, in the first stage, first adsorbing column 91a carries out the reclaiming process, second adsorbing column 91b carries out the drying step, and third adsorbing column 91c carries out the adsorbing step; in the second stage, adsorbing column 91a carries out the drying step, adsorbing column 91b carries out the adsorbing step, and adsorbing column 91c carries out the reclaiming process; and in the third stage, adsorbing column 91a carries out the adsorbing step, adsorbing column 91b carries out the reclaiming process, and adsorbing column 91c carries out the drying step.

In other words, in the first stage, of source material inlet valves 94a, 94b, 94c and adsorption outlet valves 95a, 95b, 95c, only adsorption outlet valve 95c and inlet valve 94c of the third adsorbing column 91c which is carrying out the adsorption process are open. Of drying inlet valves 96a, 96b, 96c and drying outlet valves 97a, 97b, 97c, only drying inlet valve 96b and drying outlet valve 97b of second adsorbing column 91b which is carrying out the drying step are open. Of reclaiming inlet valves 98a, 98b, 98c and reclaiming outlet valves 99a, 99b, 99c, only reclaiming inlet valve 98a and reclaiming outlet valve 99a of first adsorbing column 91a which is carrying out the reclaiming process are open.

By sequentially switching between the open and closed state for each valve in a predetermined sequence, the adsorbing step and the drying step can be carried out in the same manner as above, and the water vapor and ammonia in the denitrated gas and the water vapor in the dehydrogenated gas can be continuously adsorbed and removed. A design is also acceptable in which switching between each of the processes is carried out by providing 4 or more adsorbing columns.

Figure 3:
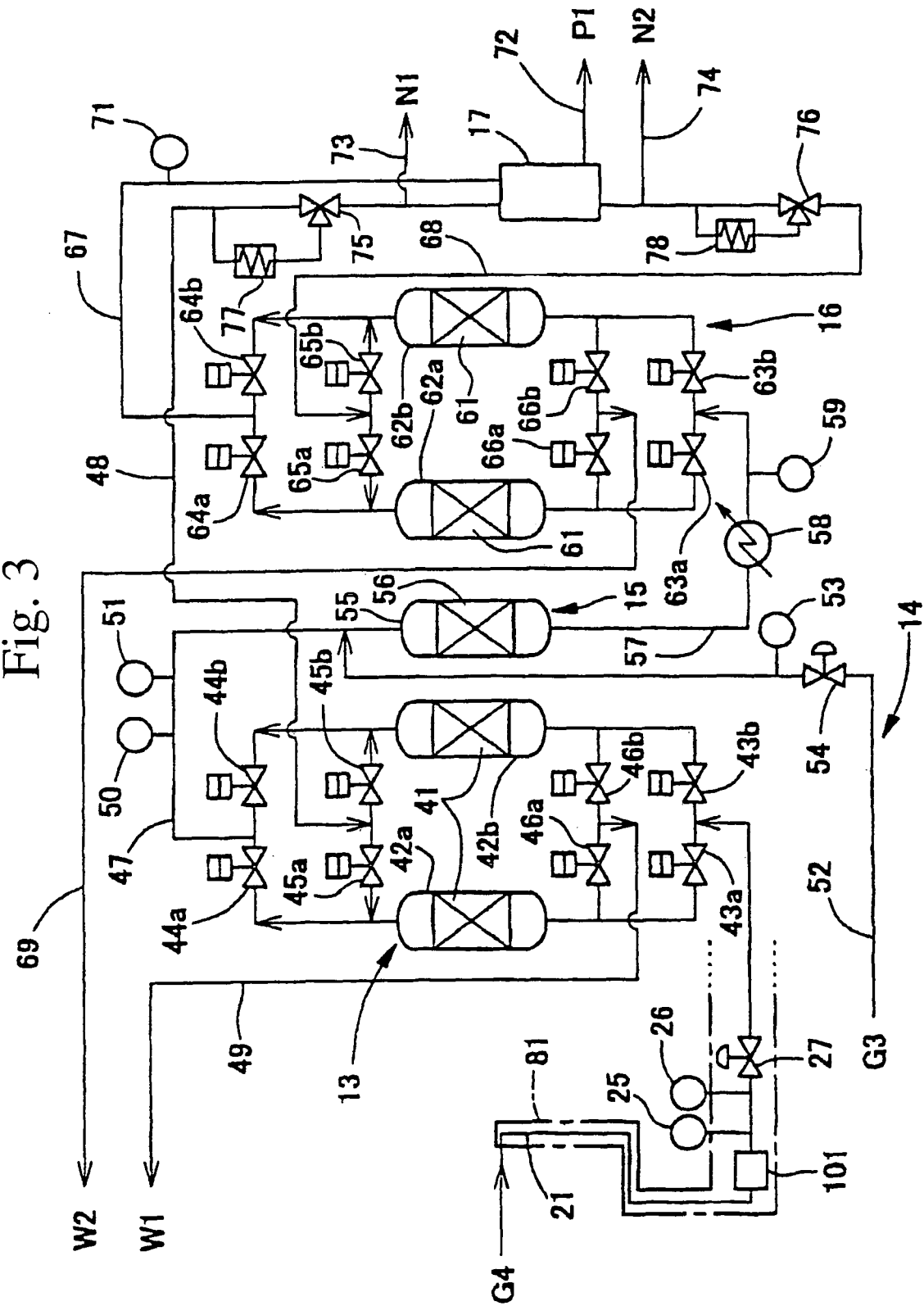
FIG. 3 is a schematic flow diagram showing a third embodiment of a gas purifying device employing the present invention.

FIG. 3 is a schematic flow diagram showing a third embodiment of a gas purifying device employing the present invention, this device carrying out a prestage purifying process prior to carrying out separating and reclaiming operations on an exhaust gas containing a rare gas removed from a plasma oxidation or plasma nitridation device, such as, for example, separating and reclaiming krypton from a mixed gas presumed to contain krypton and nitrogen as main components, and hydrogen, oxygen, ammonia, and water vapor, etc. as trace constituents, wherein this device removes from among these trace constituents at least hydrogen, ammonia and water vapor which can impair the final separating and reclaiming operations at the rare gas separating and reclaiming device. This gas purifying device is provided with an adsorbing device 13, oxygenation device 14, hydrogen oxidation device 15 and drying device 16. In addition, a rare gas separating and reclaiming device 17 is provided at a stage subsequent to the drying device 16.

In other words, FIG. 3 shows an example of the structure of the gas purifying device in the case where it is certain that nitrogen oxides are not included in the exhaust gas which is to undergo the purifying process. The device structure shown here is close to an arrangement in which the equipment for removing nitrogen oxides is omitted from the gas purifying device of the first embodiment.

For example, a source gas G4 that contains hydrogen in the amount of 2 vol % or less, oxygen in the amount of 2 vol % or less, ammonia in the amount of 1 vol % or less, and water vapor in the amount of 5 vol % as trace constituents passes from source gas introduction path 21 through moisture removing equipment 101 and flow controlling valve 27, and is guided into adsorbing device 13.

Source gas analyzer 25 and source gas flow meter 26 are provided to source gas introduction path 21, and carry out the component analysis of and measurement of the trace constituents in the source gas. The amount of introduction source gas is adjusted by flow controlling valve 27. Moisture removing equipment 101 is provided with the goal of removing water vapor in advance, so that dewing of the lines does not occur, even in the case where exhaust gas is generated that has a water vapor concentration such that dewing at room temperature occurs. Specifically, membrane separation, low temperature separation, cooling employing heat exchange, bubbling, etc. may be employed. Of course, heating can also be employed to prevent dewing by providing a line heating device 81 to the entire line through which the exhaust gas passes.

In the same manner as described above, once ammonia and water vapor have been removed in the adsorbing step at adsorbing device 13, the required amount of oxygen G3 is added to source gas G4 from oxygenation device 14, and source gas G4 is then guided into hydrogen oxidation device 15. The hydrogen is converted into water vapor in the hydrogen oxidation step, and the generated water vapor is removed in the drying step at drying device 16.

EXAMPLES

Examples will now offered to demonstrate the effects of the invention.

Denitration Step

A stainless steel reaction column (inner diameter: 17.5 mm) was filled with 15 g of Pd catalyst DASH 220D (0.5% palladium/alumina) manufactured by N.E. Chemcat Corporation. A heater was provided to the outside of the reaction column, and the temperature was controlled so that the reaction column was maintained at 300° C. For the mixed gas (introduced gas) to be processed, gases were prepared in which a mixture of equivalent amounts of krypton and nitrogen was employed as a base gas, and the concentrations of nitrogen oxide and oxygen were varied.

Ammonia was added to the introduced gas, and introduced to the reaction column at atmospheric pressure. In order to prevent deposition of nitrate, the introduced gas line was maintained at 210° C. or more. The concentration of nitric oxide and nitrogen dioxide in the outlet gas were measured using a chemiluminescence-type NOx meter, and the concentration of the nitrous oxide in the outlet gas was measured using GC-MS. The oxygen concentration was measured with GC-TCD. The composition of introduced gas and the results of analysis of the outlet gas are shown in Table 1. From these results, it may be understood that the nitrogen oxide can be removed with certainty by setting the amount of the ammonia, which is the reducing substance, added to be in excess of a suitable amount with respect to the nitrogen oxides.

TABLE 1

| | Introduction gas | | | | | | Results of outlet gas analysis | | | |
|---|---|---|---|---|---|---|---|---|---|---|
| Example No. | Flow quantity L/min | $NH_3$ % | NO % | $NO_2$ % | $N_2O$ % | $O_2$ % | NO ppm | $NO_2$ ppm | $N_2O$ ppm | $O_2$ ppm |
| 1 | 2 | 1.5 | 0.6 | 0 | 0 | 0.6 | <1 | <1 | <1 | <1 |
| 2 | 2 | 1.5 | 0 | 0.7 | 0 | 0.4 | <1 | <1 | <1 | <1 |
| 3 | 2 | 1.5 | 0 | 0 | 0.6 | 0.5 | <1 | <1 | <1 | <1 |
| 4 | 2 | 3.0 | 0.6 | 0 | 1.2 | 0.6 | <1 | <1 | <1 | <1 |
| 5 | 2 | 1.5 | 0.6 | 0 | 0 | 0.7 | <1 | <1 | 501 | <1 |

Adsorbing Step

A stainless steel adsorbing column having an inner diameter of 17.5 mm was filled with 60 g of zeolite A-3 (potassium ion-exchanged A-type zeolite, hereinafter referred to as "potassium A-type zeolite") manufactured by Tosoh Corporation, which was employed as an adsorbent. A mixed gas to which had been added equivalent amounts of krypton and nitrogen as a base gas, ammonia in the amount 0.5 vol % and water vapor in the amount of 0.5 vol %, was introduced into the adsorbing column at a 2 L/min, 25° C. The ammonia and moisture content of the outlet gas was then measured. From these results, it may be understood that after three hours or more from the start of adsorption, concentrations in the outlet gas can be maintained at 1 ppm by volume or less of ammonia, with a dew point of −80° C. or less (water 1 ppm by volume or less). In addition, repetitive adsorbing/reclaiming tests were carried out, with the process switchover time for the pair of adsorbing columns set to three hours, the reclaiming temperature set to 300° C., and the reclaimed nitrogen gas set to 0.25 L/min. From this, it was confirmed that adsorption capacity throughout the testing period did not vary from the initial level.

In addition to potassium zeolite A, sodium zeolite A (Zeolum A-4, manufactured by Tosoh Corporation) and sodium zeolite X (Zeolum F-9HA, manufactured by Tosoh Corporation) were employed, and the average krypton adsorption was measured. From these results, it was understood that the sodium zeolite A adsorbed krypton at a rate of 0.09 mol/kg (at 50 kPa, 25° C.), and sodium zeolite X adsorbed krypton at a rate of 0.09 mol/kg (at 50 kPa, 25° C.), in contrast to potassium zeolite A which adsorbed almost no krypton at all.

The krypton adsorbed by the adsorbent is exhausted along with the gas reclaimed in the reclaiming process. Thus, by employing potassium zeolite A which does not adsorb krypton, it is possible to increase the amount of krypton reclaimed. Further, it was confirmed that by employing potassium zeolite A in the later drying step as well, the adsorption and removal of moisture could be carried out with certainty while restricting loss of krypton.

Hydrogen Oxidation Step

A stainless steel reaction column (inner diameter: 17.5 mm) was filled with 30 g of Pd catalyst G74D (palladium 0.5%/alumina) manufactured by Nissan Girdler Catalyst Co. Ltd., which was employed as the hydrogen oxidation catalyst. Oxygen gas in the amount of 6 vol % was added to a gas that included hydrogen in an amount of 1 vol % in a mixture containing equal amounts of krypton and nitrogen, and this was introduced into a reaction column at 2 L/min under atmospheric pressure. The hydrogen and oxygen concentrations in the outlet gas were measured using GC-TCD. As a result, it was found that hydrogen was present in an amount of 0.1 ppm by volume or less and oxygen was present in an amount of 0.1% by volume at the outlet of the reaction column. The initial temperature of the hydrogen oxidation column at this time was 80° C., however, because of reaction heat, the temperature of the outlet gas had risen to around 170° C.

Industrial Field of Application

As explained above, the present invention is able to highly efficiently separate and remove such trace constituents as hydrogen, hydrogen and nitrogen reaction products, and water vapor, as well as nitrogen oxides, that are included in a mixed gas that has as main components nitrogen and a rare gas, particularly expense krypton or xenon. Specifically, the present invention is able to separate and remove trace constituents with certainty from an exhaust gas (mixed gas) containing a rare gas such as krypton or xenon that is produced in the processing steps, for example, the oxidation, nitridation, and oxynitridation steps for a panel substrate or semiconductor substrate in the production of a semiconductor device, flat display panel, or other electronic instrument. Thus, the overall facility and operating costs of the rare gas purifying device can be reduced.

The invention claimed is:

1. A gas purifying device for removing trace constituents from a mixed gas containing a rare gas selected from at least one of krypton and xenon and nitrogen as main components; and at least one from among hydrogen, reaction products containing both nitrogen and hydrogen, water vapor and nitrogen oxides as said trace constituents, said device provided with the following devices (i)-(vi) in this order:
  (i) reducing substance adding device for adding ammonia or hydrogen to said mixed gas as a reducing substance;
  (ii) denitration device for reacting the nitrogen oxides present in the mixed gas after addition of the reducing substance, with said reducing substance by means of a catalytic denitration reaction, and converting said nitrogen oxides to nitrogen and water vapor;
  (iii) an adsorbing device for removing water vapor and reaction products containing both nitrogen and hydrogen, in the mixed gas exiting from said denitration device by using potassium ion-exchanged A-type zeolite as an adsorbent;
  (iv) an oxygenation device for adding oxygen to the mixed gas that is leaving said adsorbing device;
  (v) a hydrogen oxidation device for converting the hydrogen in the mixed gas after the oxygen has been added to water vapor by causing a reaction with said oxygen using a hydrogen oxidation catalyst; and
  (vi) a drying device for removing the water vapor generated in said hydrogen oxidation device by using potassium ion-exchanged A-type zeolite as an adsorbent.

2. The gas purifying device according to claim 1, wherein said nitrogen oxides are at least one of nitrous oxide, nitric oxide and nitrogen dioxide.

3. The gas purifying device according to claim 1, wherein said reducing substance is hydrogen, ammonia, or a mixture thereof.

* * * * *